G. R. & C. H. SNEATH.

Dumping-Wagons.

No. 6,011. Reissued Aug. 11, 1874.

Witnesses,
R. D. Smith
E. McGallaher.

Inventors,
Geo. R. Sneath,
Chas. H. Sneath,
by their atty.,
J. S. Brown.

THE GRAPHIC CO. PHOTO-LITH. 39 & 41 PARK PLACE, N.Y.

UNITED STATES PATENT OFFICE.

GEORGE R. SNEATH AND CHARLES H. SNEATH, OF WILMINGTON, DELAWARE, ASSIGNORS OF ONE-THIRD INTEREST TO THOMAS L. SNEATH.

IMPROVEMENT IN DUMPING-WAGONS.

Specification forming part of Letters Patent No. 74,251, dated February 11, 1868; reissue No. 6,011, dated August 11, 1874; application filed September 27, 1873.

*To all whom it may concern:*

Be it known that we, GEORGE R. SNEATH and CHARLES H. SNEATH, of Wilmington, in the county of New Castle and State of Delaware, have invented an Improved Tilting Wagon; and we do hereby declare that the following is a full and exact description thereof, reference being had to the accompanying drawings, making part of this specification—

Figure 1:
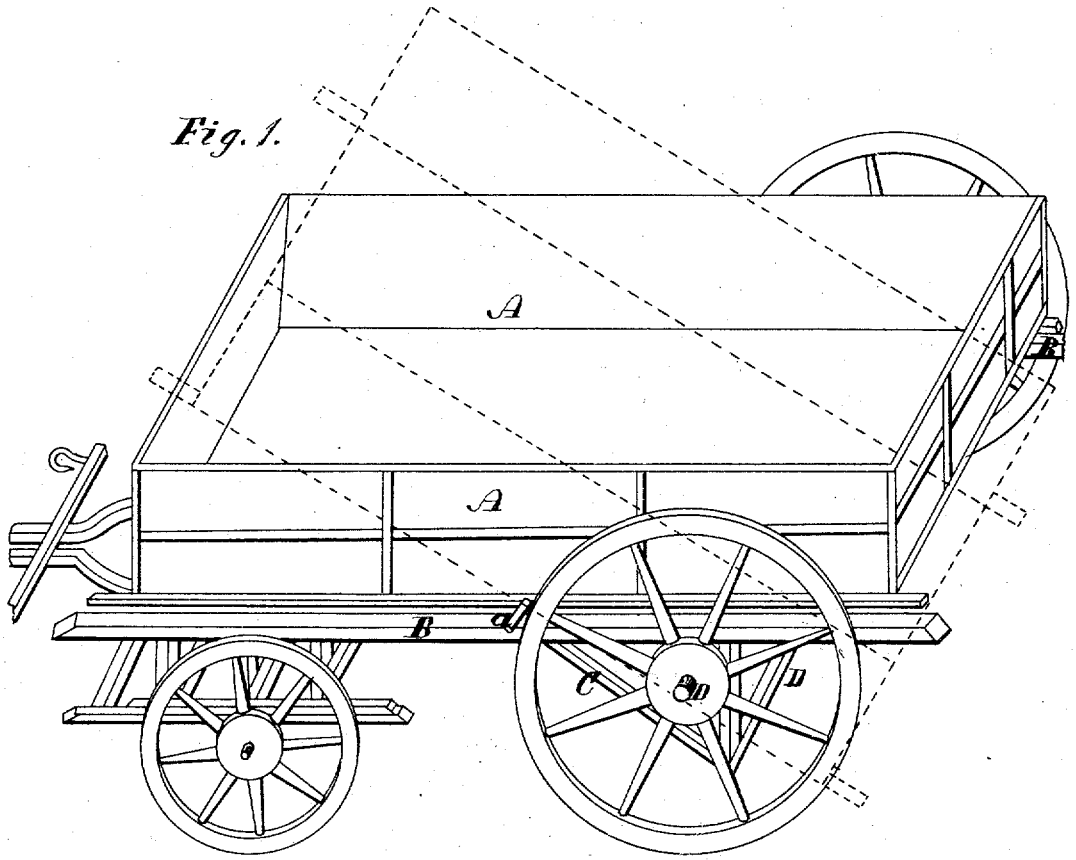
Figure 2:
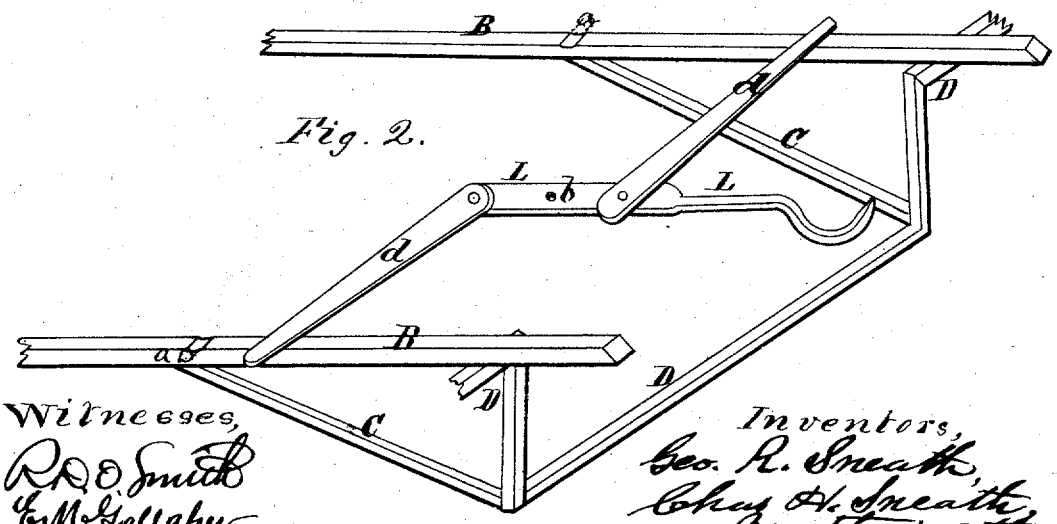

Figure 1 being a view, in perspective, of a wagon provided with our improvements; Fig. 2, a view, in perspective, of the hind axle thereof, and of the running and tilting gear connected therewith.

Like letters designate corresponding parts in both figures.

The nature of our invention consists in the employment of a bent or crank-shaped hind axle, the part bent out of the line of the axle-bearings being dropped down, so as to allow the wagon-body to be tilted backward for dumping, without sliding or altering its position on the running-gear of the wagon; and in hanging or suspending the wagon-body by means of fulcrum-pivots or trunnions upon longitudinal bars or sills extending between the front and hind axles, so that it will be tilted and dumped between the hubs of the hind wheels; also, in a peculiar and improved lever tilting device, to support the hind end of the wagon body or box, all substantially as hereinafter specified.

The forward part of the running-gear of our wagon is constructed in any ordinary manner; but the hind axle D is of bent or crank-like form between the wheels, so as to bring the middle part lower than the wheel-bearings, to an extent as great as required, and as much of the axle as will allow the wagon body or box A to drop down into the bend, so that it may be tilted backward lower than the axes of the wheels, sufficiently to dump its contents without sliding the body upon the running-gear of the wagon, as is usually required. The bed or reach of the running-gear has two longitudinal bars or sills, B B, just outside of the wagon body or box A, being suitably connected with the front and hind axles, and having braces or stays C C (or their equivalent) extending therefrom to the lower part of the hind axle, so that the latter shall firmly maintain one position at all times. Upon these side sills or bars the wagon body or box A is hung or suspended by means of two fulcrum-pivots or trunnions, *a a*, extending laterally from near the middle thereof at the bottom, and resting in suitable bearings or boxes of the said sills, so that the wagon body or box freely turns therein for tilting and dumping.

For sustaining the rear end of the wagon body or box in its upright position, and for tilting it when required, we employ a lever, L, pivoted, at *b*, in a suitable position to, and extending backward longitudinally to the back end of and beyond, the wagon-body, the projecting end terminating in a suitable handle. Two slide-arms, *d d*, are pivoted to the lever L, one forward and the other to the rear of the lever-pivot *b*, as shown in Fig. 2, and extend laterally therefrom in opposite directions to the sides of the wagon-body, being held in suitable guides to the under side thereof. They are of such length that, when the lever L is moved laterally in one direction, they will slide over and rest upon the sills or bars B B, as shown in Fig. 2, and thus sustain the rear end of the wagon-body; and when the lever L is moved sidewise in the opposite direction, the said arms will be drawn inward away from the said sills or bars, and allow the wagon-body to be tilted and to dump its contents.

The wagon-body is a little heavier forward of than behind the pivots *a a*, in order to remain in an upright position ordinarily, but to be readily tilted by a slight power.

What we claim as our invention, and desire to secure by Letters Patent, is—

1. In a dumping-wagon, the combination of fixed bearings *a a*, the tilting body A, and bent hind axle D, the bend of which extends in a vertical, or nearly vertical, plane downward from the line of the axis of the hind wheels, substantially as and for the purpose specified.

2. In a dumping-wagon having fixed bearings on which the body tilts, the wagon-body A, hung upon longitudinal sills B B, between the front and hind axles, by trunnions *a a*, so that it may be tilted and dumped between the hind wheels, all combined substantially as and for the purpose herein specified.

3. The lever L and arms *d d*, in combination with the wagon-body A and sills B B, substantially as and for the purpose specified.

GEO. R. SNEATH.
CHARLES H. SNEATH.

Witnesses:
SAML. SNEATH,
EDWIN HIRST.